: US005480737A

United States Patent [19]

Satake et al.

[11] Patent Number: 5,480,737
[45] Date of Patent: Jan. 2, 1996

[54] SOLID OXIDE ELECTROLYTE FUEL CELL

[75] Inventors: Tokuki Satake, Kobe; Hitoshi Miyamoto, Takasago; Kiyoshi Watanabe, Kobe; Fusayuki Nanjo, Kobe; Koichi Takenobu, Kobe, all of Japan

[73] Assignee: Mitsubishi Jukogyo Kabushiki Kaisha, Tokyo, Japan

[21] Appl. No.: 337,509

[22] Filed: Nov. 8, 1994

[30] Foreign Application Priority Data

Nov. 19, 1993 [JP] Japan ................... 5-290266

[51] Int. Cl.⁶ .................................................. H01M 6/18
[52] U.S. Cl. ................................ 429/30; 429/32; 429/33
[58] Field of Search ............................... 429/30, 32, 33

[56] References Cited

FOREIGN PATENT DOCUMENTS 4-8259   1/1992   Japan .
4-56075  2/1992   Japan .
6-215778 8/1994   Japan .

OTHER PUBLICATIONS

Patent Abstract of Japan, vol. 15, No. 40, (E-102), Jan. 30, 1991.

*Primary Examiner*—Stephen Kalafut
*Assistant Examiner*—Richard H. Lilley, Jr.
*Attorney, Agent, or Firm*—Wenderoth, Lind & Ponack

[57] ABSTRACT

A power generation layer includes three layers of a fuel electrode, a solid oxide electrolyte and an oxygen electrode. Both faces of the power generation layer are formed with a number of dimples that are shaped and arranged so as to satisfy (half dimple height)=3.2×(dimple diameter)−(half dimple pitch)±(dimple diameter).

1 Claim, 5 Drawing Sheets

SOLID OXIDE ELECTROLYTE FUEL CELL

BACKGROUND OF THE INVENTION

1. Field of the Invention

The present invention relates to an SOFC (solid oxide electrolyte fuel cell) and, more specifically, to an SOFC which can be used as a cell for water electrolysis, $CO_2$ electrolysis and other electrolyses, as well as for power generation.

2. Description of the Related Art

The present inventors have proposed a structure in which an oxygen electrode layer and a fuel electrode layer are jointed to the respective faces of a solid oxide electrolyte layer to constitute a 3-layered power generation member and the power generation member is formed with a number of dimples on both sides thereof, in Japanese Laid-open Utility Model Application No. Hei. 4-8259 and Japanese Laid-open Patent Application No. Hei. 6-215778 both entitled "Solid Oxide Electrolyte Fuel Cell". The former simply proposes the provision of the dimples, and the latter is directed to optimization of electrical connection between the dimples and interconnectors.

SUMMARY OF THE INVENTION

Based on the above inventions, the present inventors have discovered interrelationships, between the pitch of the dimple arrangement and the diameter and height of each dimiple, which are important factors in the power output performance of the fuel cell. An object of the present invention is to provide a high performance fuel cell by taking into account the above-described parameters. Another object of the invention is to provide a fuel cell having a dimple shape tailored to its application, such as a large-capacity application and a closed-space, small-capacity application.

Improving the power output performance based on the shape of the power generation member involves a determination of how to increase the reaction area for a certain fixed capacity. Further, a consideration needs to be given to gas flow through the cell.

It is desired that dents, in other words, protrusions of the power generation member formed of the three layers of the fuel electrode, solid oxide electrolyte and oxygen electrode should be circular for facilitating the gas flow, and rectangular for providing a large reaction area.

However, since a plurality of power generation members are employed and a gas inlet and outlet are arranged to face each other, a priority is given to the consideration of the gas flow in view of a pressure loss. Therefore, the protrusions, i.e., the outer surfaces of the dimples should have a shape similar to that of a cylinder. To increase the reaction area while satisfying this requirement, the height of the protrusions thus becomes an important factor.

To achieve these objects in light of the above-described considerations, the present invention provides an SOFC summarized below. An SOFC is shown in FIGS. 1 to 3.

In these figures, symbols 11A and 11B denote power generation members; 12, a fuel electrode; 13, a solid oxide electrolyte; 14, an oxygen electrode, 15A, dimple protrusions on the hydrogen (the fuel) side; 15B, dimple protrusions on the oxygen side; and 16A to 16C, interconnectors. Each of the power generation members 11A and 11B consists of a fuel electrode 12, solid oxide electrolyte 13 and oxygen electrode 14. The top interconnector 16A is electrically connected to the dimple protrusions (hydrogen side) 15A of the power generation layer 11A with a conductive adhesive 17, and the central interconnector 16B is electrically connected to the dimple protrusions (oxygen side) 15B of the power generation layer 11A with a conductive adhesive 19. Whether the conductive adhesives 17 and 19 are applied over the entire surface of the interconnectors 16A, 16B except for sealing portions 18 thereof or only over certain regions of the surface that correspond to the respective protrusions 15A is determined depending on the design performance of the cell.

Where the conductive adhesives 17 and 19 are applied over the entire surface, naturally the material cost is higher although almost all of transverse electrical flows are absorbed and electrical resistance is lowered.

Conversely, where the conductive adhesives 17 and 19 are applied over only regions of the surfaces, the material cost is lower although electrical flows are concentration at the respective regions and the resistance is correspondingly higher.

Therefore, the area to be coated by the conductive adhesives 17 and 19 is determined based on an economical calculation of total factors such as current price of the conductive adhesives 17 and 19.

It is desirable that the conductive adhesive 17 and the fuel electrode 12 be made of the same material, and that the conductive adhesive 19 and the oxygen electrode 14 be made of the same material. If an economical evaluation permits it, each of the conductive adhesives 17 and 19 may be made of a material, such as platinum, that is different from the electrode material. The respective members thus formed are assembled as shown in FIG. 3. The output power can further be increased by arranging a plurality of the assemblies of FIG. 3 vertically or horizontally.

After entering through a fuel inlet 20, a fuel such as $H_2$ is sufficiently diffused by the protrusions 15A while flowing between the interconnector 16A and the outer surfaces of the dimples. Similarly, after entering through an oxygen (air) inlet 21, oxygen (air) is diffused by the dimple protrusions 15B, ionized in the oxygen electrode 14, and passed through the solid oxide electrolyte 13. In the fuel electrode 12, the fuel reacts with the oxygen ions to produce electric energy. Non-reacted fuel and oxygen (air) go out through outlets that are disposed opposite the inlets 20 and 21, respectively.

In the SOFC having the above structure, there are two important considerations in optimizing the power output performance: maximizing the surface area of the power generation layer, and facilitating the diffusion of gases. Considering the above, the interrelationships between the pitch of the dimples and the diameter and height of the dimples are most important. The dimple half pitch (horizontal distance between a top and a bottom of adjacent dimples) is preferably as small as possible. The diameter and the half height of the dimples contribute much to the power output performance, although the performance is not necessarily improved by simply increasing the surface area per unit capacity. For example, when examining the effect of the half height (H) with a certain fixed diameter (D) of the dimple, the inventors have found that there is a range in which an increase in height causes a deterioration in performance. Further, it has been found that the solid oxide electrolyte 13 should be thin. However, even if the electrolyte layer is excessively thin, there is only a little effect on the power output performance.

FIG. 2 (cross section taken along line 2—2 of FIG. 1) shows what is meant by the dimple half height (H), dimple half pitch (($\frac{1}{2}$)P) and dimple diameter (D).

After various investigations in view of the above-described problems and based on the above knowledge, the inventors have found the following. It is desirable for a maximum number of dimples 15A and 15B to be provided on both sides of the power generation layer 11A (11B) as long as they do not affect the gas flows. Under this condition, a maximum apparent power generation efficiency can be obtained by employing a dimple shape that satisfies H=3.2D–(½)P±D. The values in the above equation are for improving the apparent power generation efficiency, and do not depend on the electrode material. That is, the above equation serves to determine the shape of dimples that will optimize the basic performance of the fuel cell.

Based on the above results, in the SOFC according to the invention, the power generation member including three layers comprising the fuel electrode, solid oxide electrolyte and oxygen electrode, is formed with a plurality of dimples on both sides, wherein the dimples are shaped and arranged so as to satisfy H= 3.2D–(½)P±D.

With this configuration, the SOFC of the invention can provide a high power output in accordance with application such as large-capacity power generation for land use, middle- or small-capacity power generation for cogeneration, and a power supply for use in a closed space and which is required to be compact.

DESCRIPTION OF PREFERRED EMBODIMENTS

Figure 1:
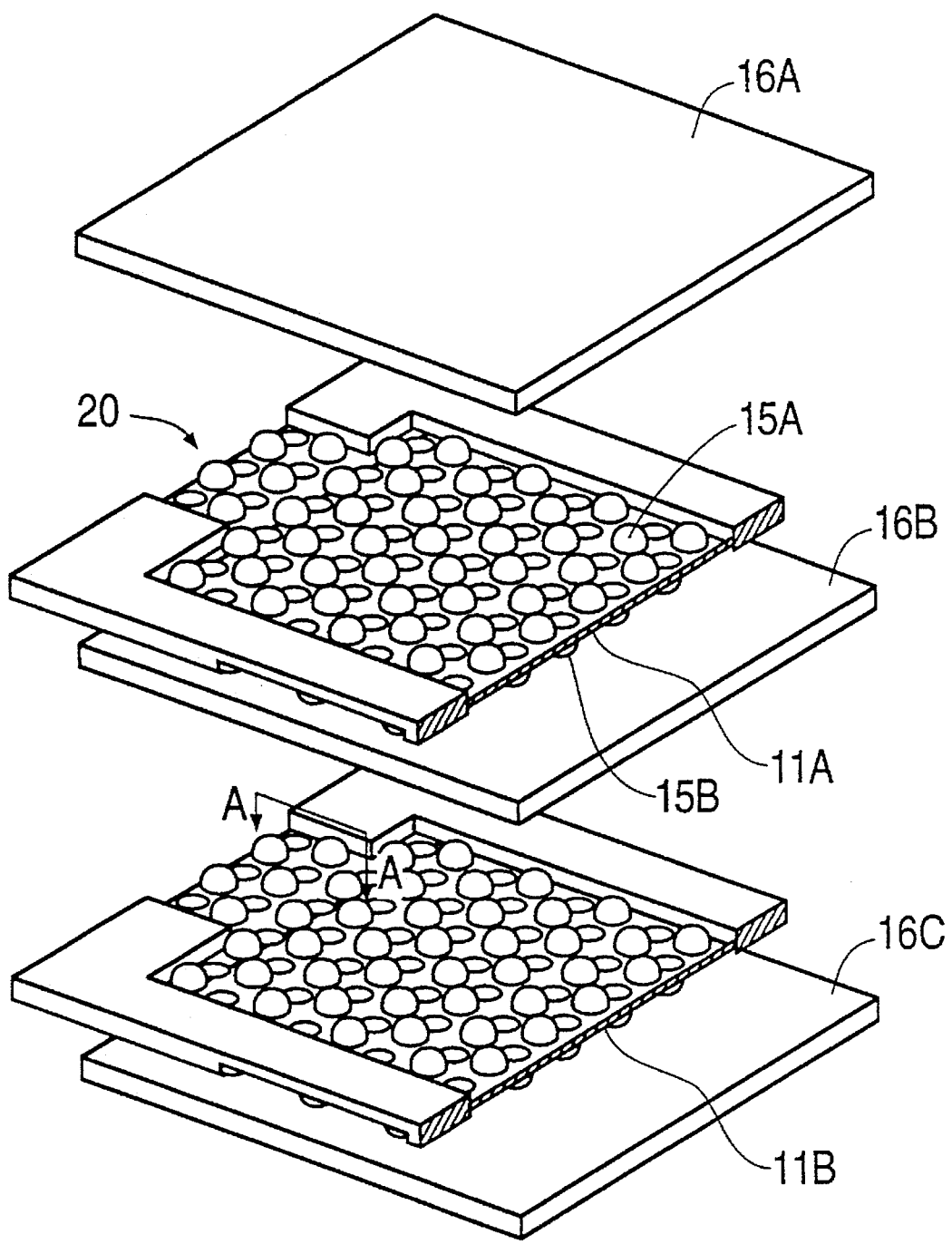
FIG. 1 is an exploded perspective view of an embodiment of an SOFC according to the present invention.
Figure 2:
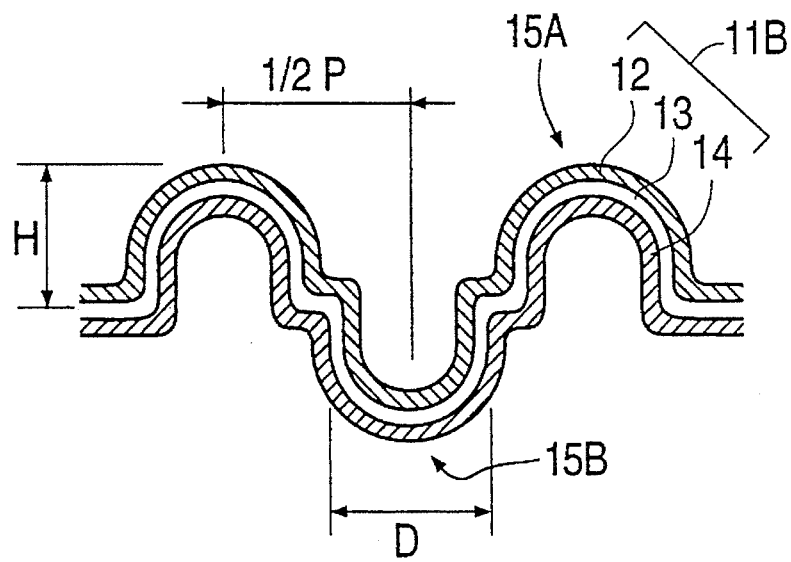
FIG. 2 is an enlarged sectional view taken along line 2—2 in FIG. 1.
Figure 3:
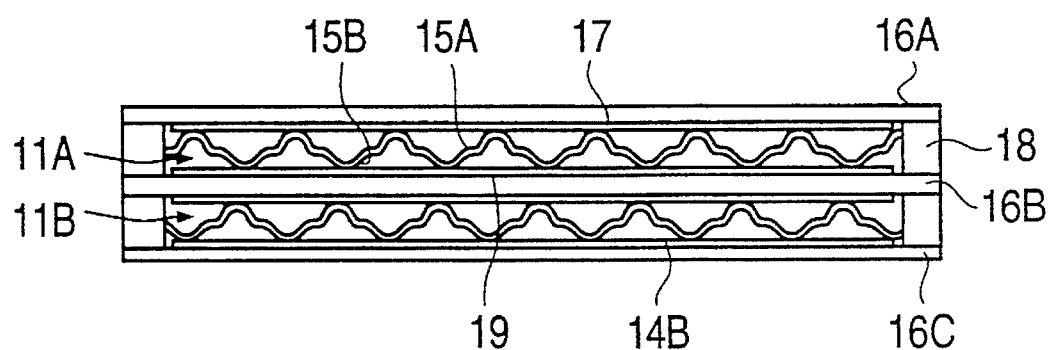
FIG. 3 is a sectional view in an assembled state of the SOFC in FIG. 1.

A preferred embodiment of the present invention will be described below in detail with reference to FIGS. 1 to 3.

In general, a fuel electrode 12, a solid oxide electrolyte 13 and an oxygen electrode 14, which constitute a power generation member 11, are made of the following materials. Fuel electrode 12: Ni/YSZ, NiCeO$_2$/YSZ, and like materials; solid oxide electrolyte 13: YSZ; and oxygen electrode 14: LaSrMnO$_3$, LaCoO$_3$ and like materials. Interconnectors 16A to 16C are made of LaMgCrO$_3$ or Ni-based refractory alloys, for instance.

In this embodiment, to evaluate shape-induced differences in performance, the following materials were used. Fuel electrode 12: Ni/YSZ (60:40); solid oxide electrolyte 13: YSZ; oxygen electrode 14: LaSrMnO$_3$; interconnectors 16A to 16C: LaSrCrO$_3$.

Other fixed parameters that were used in experiments are as follows. The particle diameters of materials used for the fuel electrode 12 and the oxygen electrode 14 were 1.95 μm and 2.45 μm, respectively. The gas diffusion coefficient, i.e., (interstice ratio)/(bending degree) ε/τ in each of the electrodes, was 0.02. The degree of sintering, i.e., (sintering length)/(particle diameter), between each electrode and the solid oxide electrolyte 13 (YSZ) was 0.04. The power generation atmosphere temperature of a cell accommodating the power generation member 11 was 1,000° C. Further, humidified hydrogen and air were supplied to the fuel electrode 12 and the oxygen electrode 14, respectively.

Under the above conditions, first, an attempt was made to determine a proper thickness of the solid oxide electrolyte 13 (YSZ). Results are shown in FIG. 4.

The other conditions in this experiment were as follows. Thickness of the fuel electrode 12: 50 μm; thickness of the oxygen electrode 14: 75 μm; diameter D of dimples: 1.25 mm; half height H of dimples: 1.06 mm; and half pitch (½)P of dimples: 1.38 mm.

Figure 4:
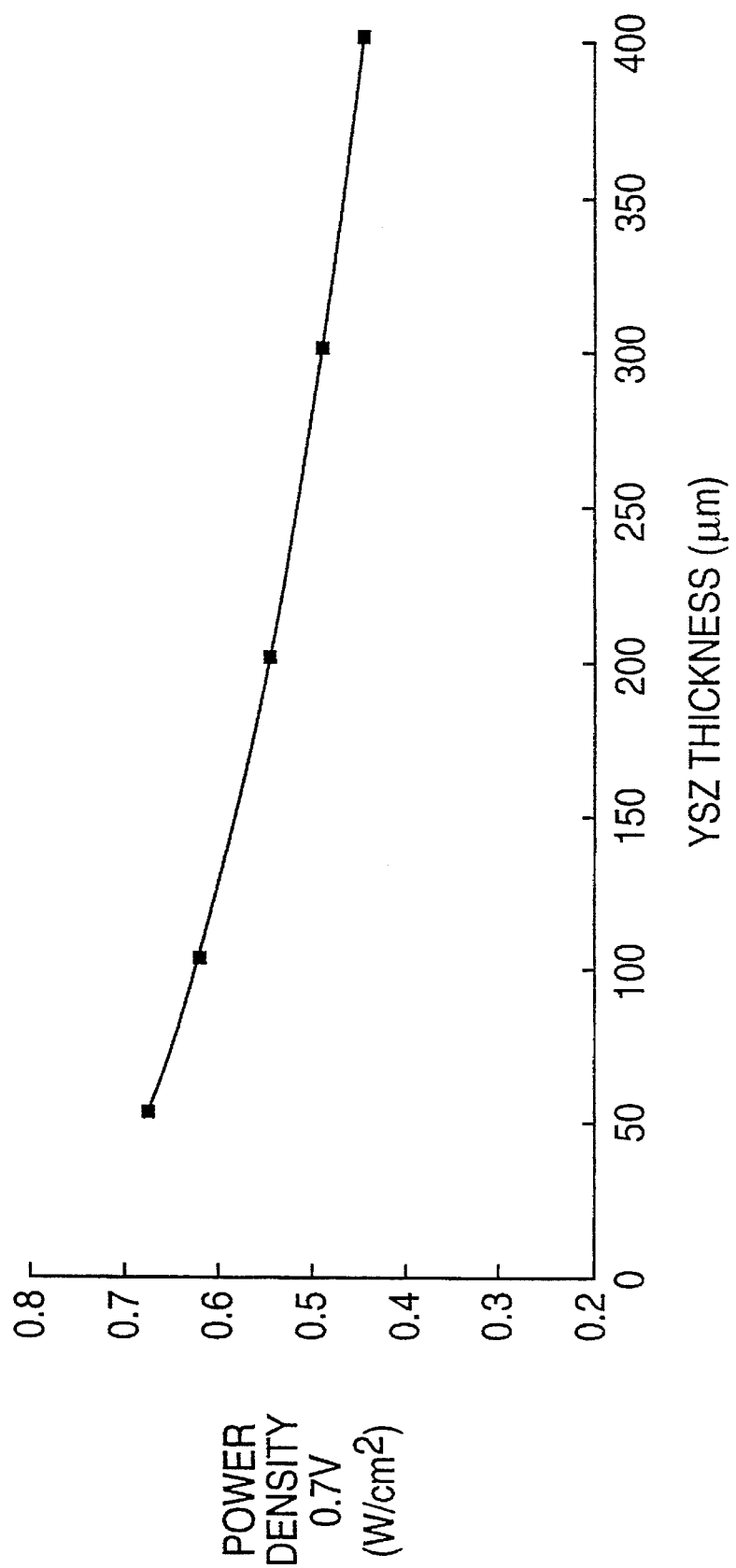
FIG. 4 is a graph showing a relationship between the SOFC performance and the thickness of YSZ that constitutes a solid oxide electrolyte.

As is apparent from FIG. 4, the YSZ thickness greatly influences the power output performance (power density). That is, it has been found that over the range of thicknesses used in the experiment, the power generation performance is improved as YSZ is made thinner. However, to determine an optimum shape of dimples themselves, the YSZ thickness was fixed at 100 μm and 200 μm in the following experiments in addition to the fact that the thicknesses of the fuel electrode 12 and the oxygen electrode 14 were fixed. Further, to facilitate the experiments for determining the optimum shape, the dimple half pitch ((½)P) was fixed at 1.85 mm instead of the above-mentioned value of 1.38 mm.

The parameters for determining the shape were set as follows.

Figure 5:
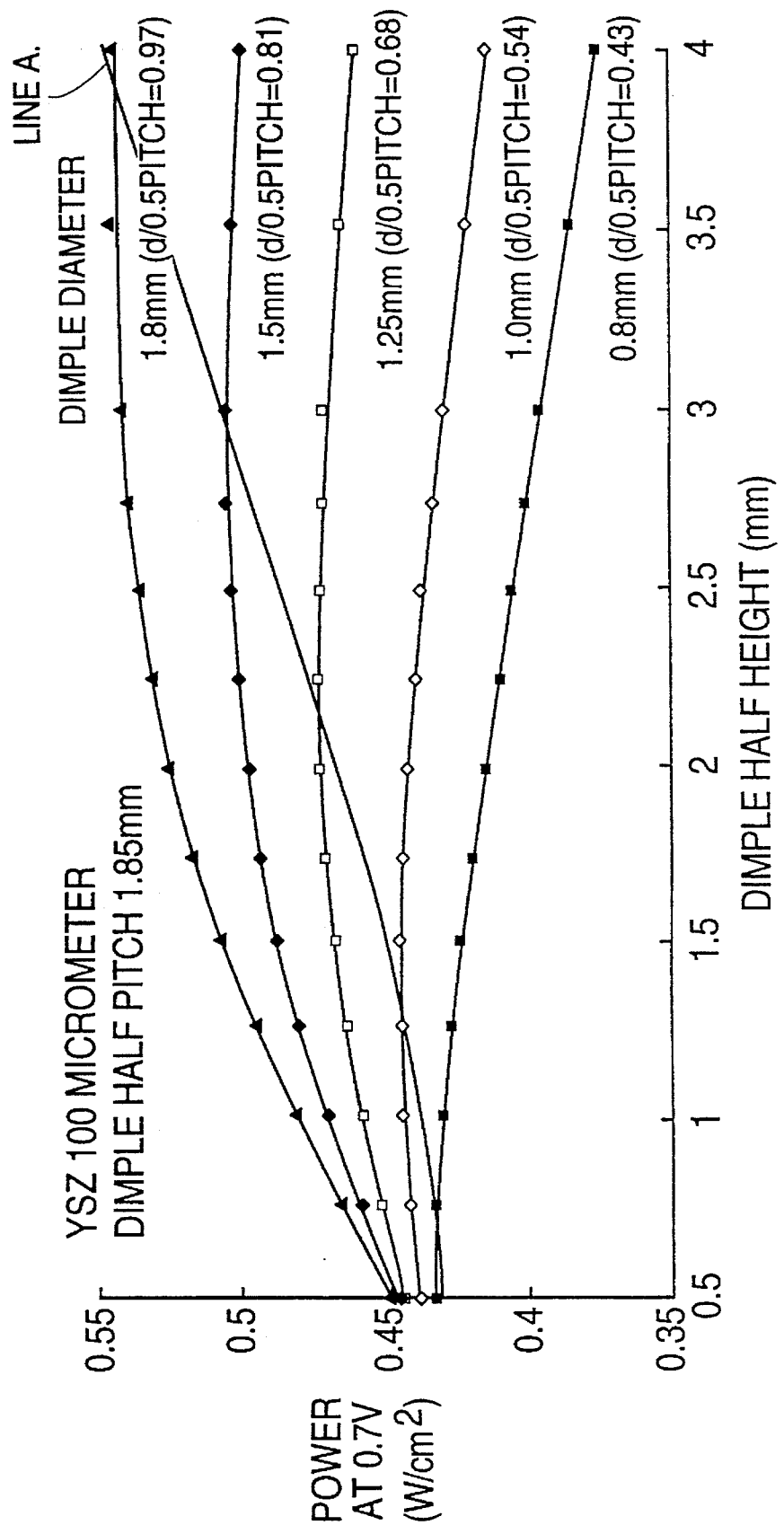
FIG. 5 is a graph showing how the diameter and height of dimples influence the SOFC performance when the YSZ thickness is set at 100 μm (see FIG. 4) and the dimple pitch is fixed.
Figure 6:
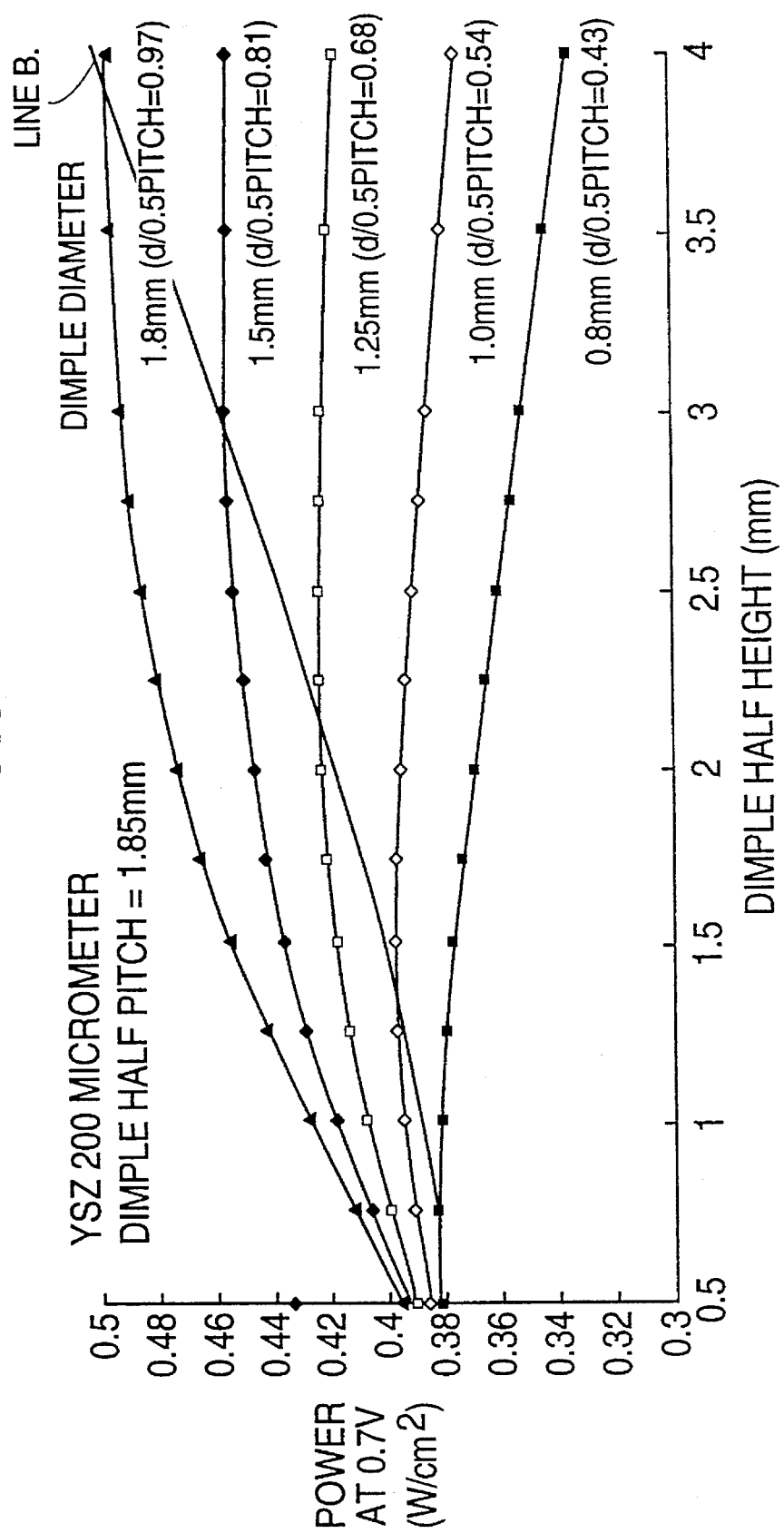
FIG. 6 is a graph showing how the diameter and height of dimples influence the SOFC performance when the YSZ thickness is set at 200 μm (see FIG. 4) and the dimple pitch is fixed.

(1) Dimple diameter D (ram) (and its ratio to the half pitch ((½)P): 0.8 (0.43), 1.0 (0.54), 1.25 (0.68), 1.5 (0.81), 1.8 (0.97) (2) Dimple half height (H): 0.5 to 4.0 mm with intervals of 0.25 mm FIGS. 5 and 6 show results of experiments in which the above parameters were varied while the YSZ thickness remained fixed at 100 μm (FIG. 5) and 200 μm (FIG. 6).

The two graphs show the same tendency in performance. That is, although the YSZ thickness changes absolute values of the performance, it has little influence on such factors as the dimple diameter (D) and the dimple half height (H). Although the dimple diameter (D) cannot physically exceed the half pitch ((½)P), it is desirable for the former to be closest to the latter.

With the half pitch ((½)P) fixed at 1.85 mm, a maximum power output with a dimple diameter D of 1.8 mm is obtained when the dimple half height H is 3.5 mm. Further, a maximum power output with a dimple diameter D of 1.25 mm is obtained when the dimple half height H is 2 mm. When the dimple diameter D is 0.8 mm, the power output steadily decreases as the dimple half height H increases from 0.5 mm to 4 mm. These results suggest that there is a correlation between the diameter (D) and the half height (H) of dimples.

Based on the above results, a cell satisfying Equation (1) has an approximately maximized performance.

$$\text{(dimple half height } (H)) = 3.2 \times \text{(dimple diameter } (D)) - \text{(dimple half pitch } (\tfrac{1}{2})P) \tag{1}$$

Line A in FIG. 5 and line B in FIG. 6 are lines indicative of maximum performance which are plotted from Equation (1). Lines A and B cover all the area representing maximum performance on FIGS. 5 and 6. Based on the characteristic curves of FIGS. 5 and 6, a desired dimple shape has been obtained as Equation (2) that includes a desirable range for actual use which range corresponds to the dimple diameter D.

$$H = 3.2 \times D - (\tfrac{1}{2})P \pm D \qquad (2)$$

As is apparent from the above description, there is an upper limit in the dimple height (H) to increase the reaction surface area per single cell that accommodates a single power generation member 11. Usually, increasing the cell height causes no problem in large-capacity power generation on land. However, when the SOFC is used in a closed space such as a spacecraft or a submarine, priority might be given to spatial limitations rather than cost; that is, compactness becomes more of a requirement.

Therefore, to obtain a desired power generation output for each application, it should be determined as to whether to increase a power output per cell (the initial cost is low by virtue of a small number of cells but the total height is large), or to reduce the total height of stacked cells (the initial cost is high due to an increased number of cells). In addition, the gas flows and the pressure loss are influenced by whether the ratio between the diameter and the half pitch is increased and the pitch reduced to obtain a large power output or, conversely, the ratio between the diameter and the half pitch is reduced and the pitch increased.

In connection with this, it is a matter in designing the fuel cell to judge, depending on a required power output, whether the addition of an auxiliary power supply causes any problem in performance. An optimum shape can be selected according to the invention.

Various details of the invention may be changed without departing from its spirit or its scope. Furthermore, the foregoing description of the embodiments according to the present invention is provided for the purpose of illustration only, and not for the purpose of limiting the invention as defined by the appended claims and their equivalents.

We claim:

1. A solid oxide electrolyte fuel cell comprising: a power generation member of three superposed layers including a fuel electrode, a solid oxide electrolyte and an oxygen electrode, the power generation member having a plurality of dimples on opposite sides thereof, said dimples being shaped and arranged so as to satisfy: (dimple half height)= 3.2×(dimple diameter)−(dimple half pitch)±(dimple diameter).

* * * * *